United States Patent [19]
Arimilli et al.

[11] Patent Number: 6,094,710
[45] Date of Patent: Jul. 25, 2000

[54] METHOD AND SYSTEM FOR INCREASING SYSTEM MEMORY BANDWIDTH WITHIN A SYMMETRIC MULTIPROCESSOR DATA-PROCESSING SYSTEM

[75] Inventors: Ravi Kumar Arimilli, Austin; John Steven Dodson, Pflugerville; Jerry Don Lewis, Round Rock, all of Tex.

[73] Assignee: International Business Machines Corporation, Armonk, N.Y.

[21] Appl. No.: 08/992,786

[22] Filed: Dec. 17, 1997

[51] Int. Cl.[7] .................................. G06F 12/00
[52] U.S. Cl. .................. 711/153; 711/148; 711/147; 711/170; 711/173
[58] Field of Search .................. 711/147, 148, 711/153, 170, 173

[56] References Cited

U.S. PATENT DOCUMENTS

| | | | |
|---|---|---|---|
| 5,684,993 | 11/1997 | Willman | 395/677 |
| 5,768,547 | 4/1997 | Ezzet | 395/309 |
| 5,784,697 | 7/1998 | Funk et al. | 711/170 |
| 5,862,357 | 1/1999 | Hagersten et al. | 395/309 |
| 5,887,138 | 7/1996 | Hagersten et al. | 395/200.45 |

*Primary Examiner*—Eddie P. Chan
*Assistant Examiner*—Kimberly N. McLean
*Attorney, Agent, or Firm*—Volel Emile; Felsman, Bradley, Vaden, Gunter & Dillon, LLP

[57] ABSTRACT

A method and system for increasing system memory bandwidth within a symmetric multiprocessor data-processing system are disclosed. The symmetric multiprocessor data-processing system includes several processing units. With conventional systems, all these processing units are typically coupled to a system memory via an interconnect. In order to increase the bandwidth of the system memory, the system memory is first divided into multiple partial system memories, wherein an aggregate of contents within all of these partial system memories equals to the contents of the system memory. Then, each of the processing units is individually associated with one of the partial system memories, such that the bandwidth of the system memory within the symmetric multiprocessor data-processing system is increased.

6 Claims, 2 Drawing Sheets

METHOD AND SYSTEM FOR INCREASING SYSTEM MEMORY BANDWIDTH WITHIN A SYMMETRIC MULTIPROCESSOR DATA-PROCESSING SYSTEM

BACKGROUND OF THE INVENTION

1. Technical Field

The present invention relates to a method and system for utilizing system memories in general and, in particular, to a method and system for utilizing system memories within a symmetric multiprocessor data-processing system. Still more particularly, the present invention relates to a method and system for increasing system memory bandwidth within a symmetric multiprocessor data-processing system.

2. Description of the Prior Art

The performance of a system memory in a data-processing system depends on both latency and bandwidth. In a conventional uniprocessor data-processing system, the latency of a system memory is generally more important to the efficient operation of cache memories while the bandwidth of the system memory is generally more important to the efficient operation of I/O components. However, as the number/size of cache memories increases, the bandwidth of the system memory becomes important to the cache memories also. Especially in a symmetric multiprocessor (SMP) data-processing system in which the number/size of the cache memory is much higher than the conventional uniprocessor data-processing system, the bandwidth of the system memory has a more direct impact on the performance of the cache memories, which will subsequently affect the overall system performance.

An SMP data-processing system has multiple processing units that are generally identical. In other words, these processing units have the same architecture and utilize a common set or subset of instructions and protocols to operate. Typically, each processing unit includes a processor core having at least one execution unit for carrying out program instructions. In addition, each processing unit may include at least one level of caches, commonly referred to as L1 or primary caches, which are implemented with high-speed memories. In most cases, a second level of caches, commonly referred to as L2 or secondary caches, may also be included in each processing unit for supporting the first level caches. Sometimes, a third level of caches, commonly referred to as L3 or tertiary caches, may also be included in each processing unit for supporting the second level caches. Each level of cache stores a subset of the data and instructions contained in the system memory for low latency access by the processor cores.

Often, these caches have a data width of two to four words in order to match the access bandwidth of the processor cores. Similarly, the system memory is also two to four words wide in order to match the width of the caches. Hence, the bandwidth of the system memory can easily be doubled or quadrupled by simply doubling or quadrupling the width of the system memory. However, additional hardware is required for the multiplexing between the caches and the system memory, which may lead to additional cost and lower system performance. The present invention provides an improved method for increasing the bandwidth of a system memory within a SMP data-processing system without resorting to increasing the data width of the system memory.

SUMMARY OF THE INVENTION

In view of the foregoing, it is therefore an object of the present invention to provide an improved method and system for utilizing system memories.

It is another object of the present invention to provide an improved method and system for utilizing system memories within a symmetric multiprocessor data-processing system.

It is yet another object of the present invention to provide an improved method and system for increasing system memory bandwidth within a symmetric multiprocessor data-processing system.

In accordance with a method and system of the present invention, a symmetric multiprocessor data-processing system includes several processing units. With conventional systems, all these processing units are typically coupled to a system memory via an interconnect. However, in accordance with a preferred embodiment of the present invention, the bandwidth of the system memory can be increased by first dividing the system memory into multiple partial system memories, wherein an aggregate of the contents within all of these partial system memories forms the contents of the system memory. Then, each of the processing units can be individually associated with one of the partial system memories, such that the bandwidth of the system memory within the symmetric multiprocessor data-processing system is increased. In addition, the system memory controller resource can be increased and thus the overall bandwidth of the symmetric multiprocessor data-processing system is increased.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be applicable to any symmetric multiprocessor (SMP) data-processing system.

Figure 1:
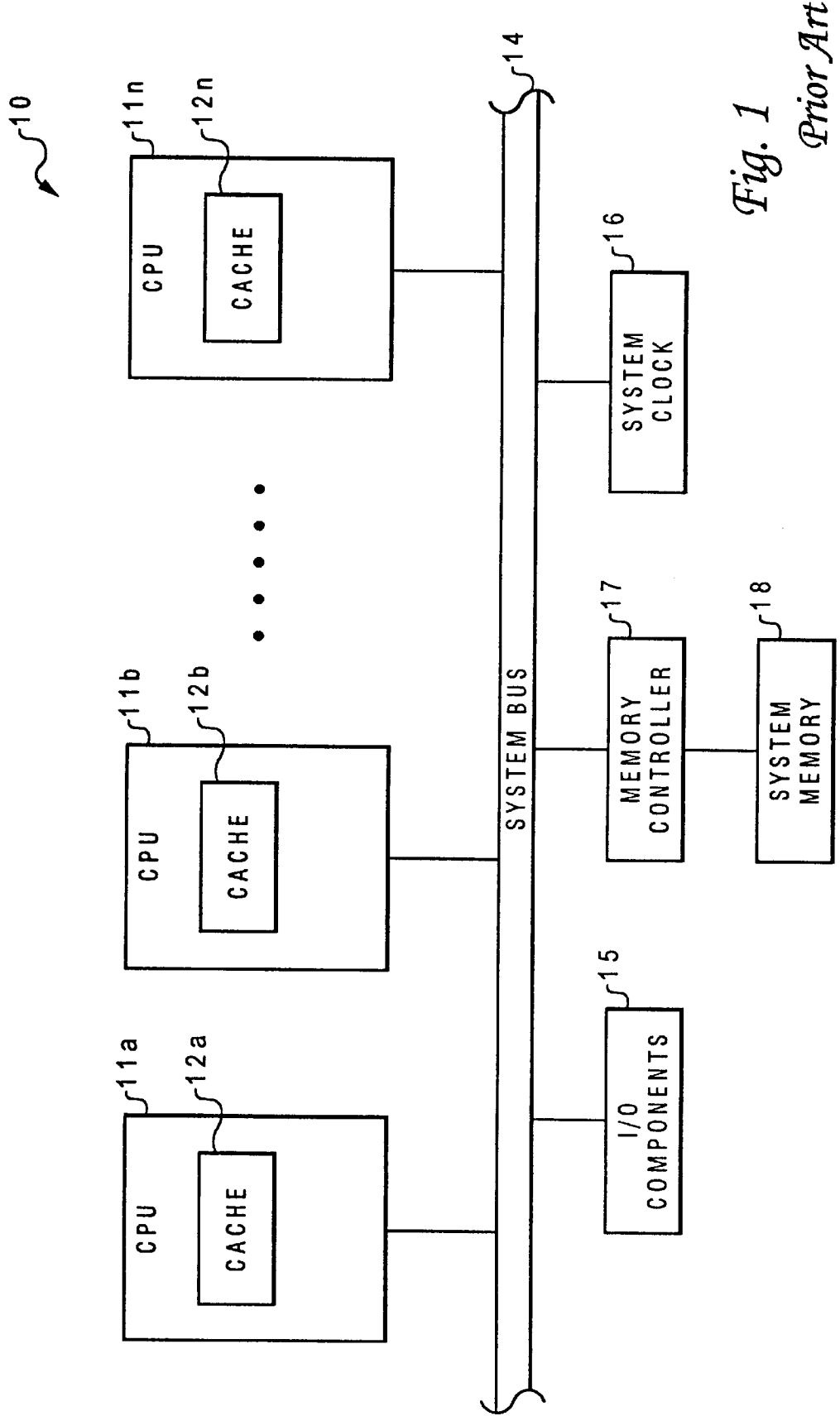
FIG. 1 is a block diagram of a SMP data-processing system in accordance with the prior art.

Referring now to the drawings and, in particular, to FIG. 1, there is depicted a block diagram of a SMP data-processing system 10 in accordance with the prior art. SMP data-processing system 10 includes multiple central processor units (CPUs) 11a–11n, and each of CPUs 11a–11n contains as least one level of local cache. As shown, CPU 11a contains a primary cache 12a, CPU 11b contains a primary cache 12b, and CPU 11n contains a primary cache 12n.

All CPUs 11a–11n are coupled to an interconnect such as a system bus 14. A system clock 16 is coupled to system bus 14 for supplying clock signals to all the components within SMP data-processing system 10, including I/O components 15. In addition, a system memory 18 is coupled to system bus 14 via a memory controller 17. System memory 18 contains various instructions and data for the normal operations of SMP data-processing system 10.

A typical size allocation for each level of the memory hierarchy within SMP data-processing system 10 are as follows. Each primary cache is approximately 64 KBytes in size, with 32 KBytes for instruction-caching and 32 KBytes for data-caching. The system memory is approximately 4 GBytes. The latency associated with accessing each level of the memory hierarchy is typically one processor-clock cycle and 65 processor-clock cycles for the primary cache and the system memory, respectively.

The data width of caches 12a–12n is typically two to four words. By the same token, the width of system memory 18 is also two to four words wide in order to coincide with the width of the interconnect of caches 12a–12n. With the configuration under the prior art, it is quite difficult to increase the bandwidth of system memory 18 without adding additional hardware such as bus width conversion logic circuitry placed between system bus 14 and system memory 18. However, this type of hardware tends to increase the access time to system memory 18 such that the advantage gained from a wider bandwidth may be neutralized.

Figure 2:
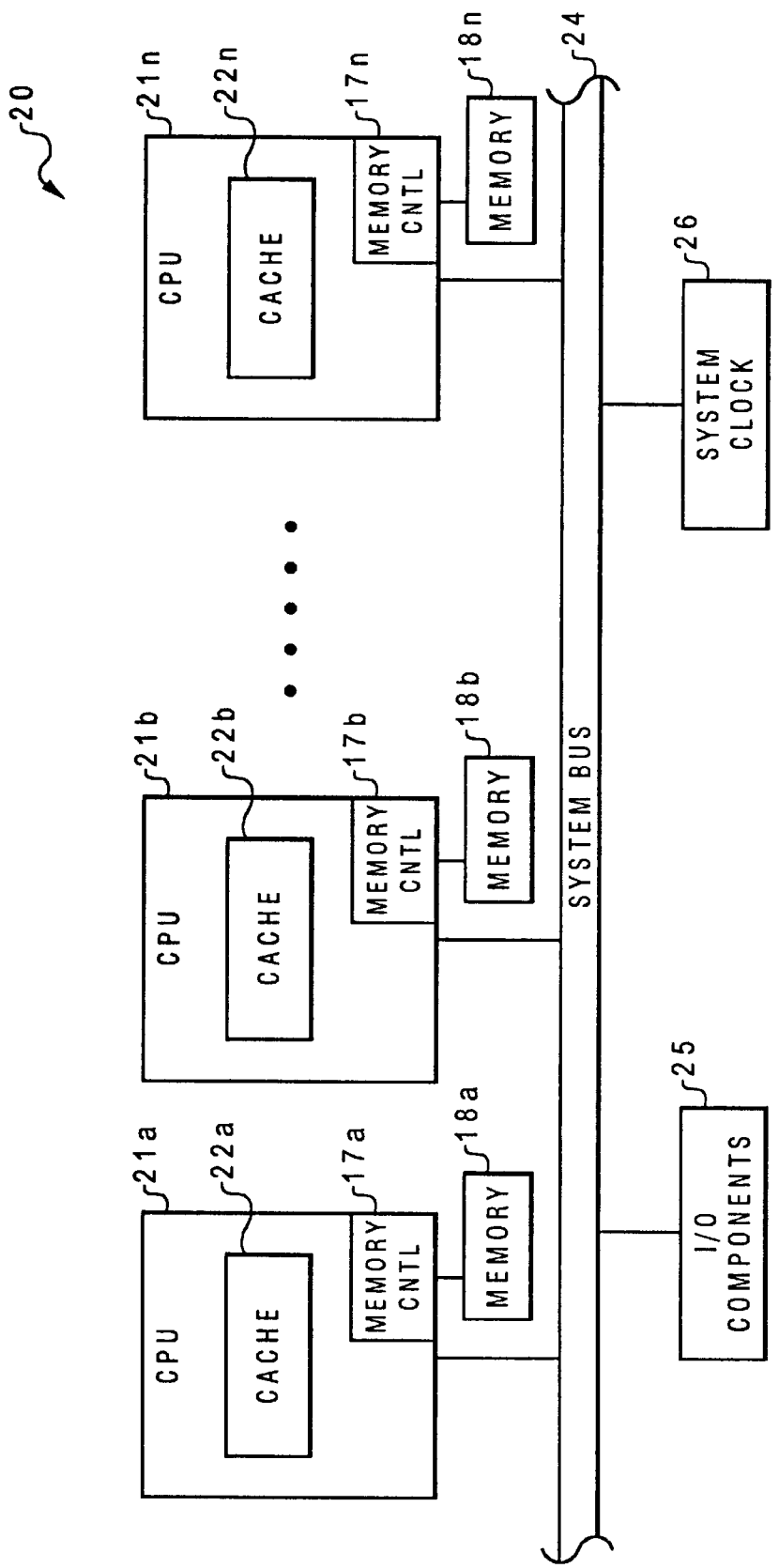
FIG. 2 is a block diagram of a SMP data-processing system in accordance with a preferred embodiment of the present invention.

With reference now to FIG. 2, there is depicted a block diagram of a SMP data-processing system 20 in accordance with a preferred embodiment of the present invention. SMP data-processing system 20 includes multiple central processor units (CPUs) 21a–21n, and each of CPUs 21a–21n contains as least one level of local cache. As shown, CPU 21a contains a primary cache 22a, CPU 21b contains a primary cache 22b, and CPU 21n contains a primary cache 22n.

All CPUs 21a–21n are coupled to an interconnect such as a system bus 24. For enhanced scalability, the interconnect may also be implemented by utilizing a cross-bar switch. A system clock 26 is coupled to system bus 24 for supplying clock signals to all the components within SMP data-processing system 20, including I/O components 25.

For the purpose of illustration, a CPU and a primary cache (such as CPU 21a and primary cache 22a as depicted in FIG. 2) may be collectively known as a processing unit. Although a preferred embodiment of an SMP data-processing system is described in FIG. 2, it should be understood that the present invention can be practiced within a variety of SMP data-processing system configurations. For example, a secondary or a tertiary cache may be included within each processing unit of the SMP data-processing system.

As a preferred embodiment of the present invention, a system memory of a SMP data-processing system (such as system memory 18 of SMP data-processing system 10 shown in FIG. 1) is divided into a multiple number of partial system memories, such that an aggregate of contents within all of the partial system memories forms the contents of the system memory. As shown in FIG. 2, system memory 18 from FIG. 1 is divided into partial system memories 18a–18n. The aggregate of contents stored in each of partial system memories 18a–18n is equivalent to the total contents of system memory 18 at all times, had system memory 18 been utilized instead of partial system memories 18a–18n.

Each of the partial system memories is physically but not logically associated with one of the processing units within the SMP data-processing system. Each of the partial system memories is physically associated with one of the processing units preferably via a memory controller. As shown, each of partial system memories 18a–18n is coupled to one of processing units 21a–21n via one of the corresponding memory controllers 17a–17n. Generally speaking, each of memory controllers 17a–17n is similar to memory controller 17 shown in FIG. 1.

In addition, each of memory controllers 17a–17n includes a range register for identifying an address range of the corresponding partial system memories 18a–18n such that all the address spaces of the "original" system memory will be evenly covered with no gaps or overlaps. The distribution of the address spaces among partial system memories 18a–18n may be performed by any hashing scheme that is well-known in the art. Further, each of partial system memories 18a–18n may or may not be covering a contiguous address space of the "original" system memory, but there should be absolutely no duplication of data among partial system memories 18a–18n.

A preferred size allocation for each level of the memory hierarchy within SMP data-processing system 20 is as follows. Each primary cache is approximately 64 KBytes total in size, with 32 KBytes for instruction-caching and 32 KBytes for data-caching. The size of each of partial system memories is preferably the size of the "original" system memory 18 divided by the number of processing units within the entire SMP data-processing system. For example, if system memory 18 is 4 GBytes and there are four processing units within SMP data-processing system 20, then each of the four partial system memories 18a–18n is approximately one GByte in size.

However, it is not necessary to have the system memory divided evenly. Four example, if system memory 18 is 4 GBytes and there are four processing units within SMP data-processing system 20, two of four memory controllers can be connected to 2 GBytes of partial system memory each while the other two memory controllers could have no partial system memory connected to them at all, giving a total of 4 GBytes for the total system memory. Nevertheless, the maximum benefit of the present invention can only be achieved when the size of all the partial system memory is closed to even.

The latency associated with accessing each level of the memory hierarchy is typically one processor-clock cycle for the primary cache and approximately five processor-clock cycles for the partial system memory connected directly to the processing unit which is requesting data, and approximately 65 processor-clock cycles for the partial system memory connected to any other processing units. Thus, the use of partial system memories greatly improves system memory access time.

As has been described, the present invention provides a method for increasing system memory bandwidth within a SMP data-processing system. Bandwidth is increased by implementing system memory as multiple partial system memories instead of a single system memory as is conventional in the prior art.

One of the major benefits of the present invention is scalability. As more processing units are added to the SMP data-processing system, additional system memory space can be added without any extensive renovation to the system architecture itself. In addition, the present invention provides an intrinsic flexibility to the SMP data-processing system because not all of the partial system memories within the system have to be populated. Thus, any one of the partial system memories can be turned off or on as desired. Also, the bus traffic between the system memory and its controller has now been distributed among all the partial system memories such that parallel bus traffic is allowed. From a system performance standpoint, the present invention enables more memory control resource (i.e., number of read/write queues) and provides a lower latency for the overall access to the system memory.

While the invention has been particularly shown and described with reference to a preferred embodiment, it will be understood by those skilled in the art that various changes in form and detail may be made therein without departing from the spirit and scope of the invention.

What is claimed is:

1. A symmetric multiprocessor data processing system comprising:

a plurality of processing units, wherein each of said processing units includes a cache memory;

a plurality of partial system memories, wherein content size of at least one of said plurality of partial system memories is different from another one of said plurality of partial system memories, wherein an aggregate of contents within all of said plurality of partial system memories represents all contents of a system memory and there is no duplication of said contents among any of said plurality of partial system memories, wherein addresses are distributed among said plurality of partial system memories according to a hashing scheme such that addresses within each of said partial system memories are non-contiguous; and a plurality of independently operable memory controllers, wherein each of said plurality of memory controllers is coupled to one of said plurality of processing units and one of said plurality of partial system memories.

2. The symmetric multiprocessor data processing system according to claim 1, wherein a number of said plurality of partial system memories is equal to a number of said plurality of processing units.

3. The symmetric multiprocessor data processing system according to claim 1, wherein said memory controller further includes a range register.

4. The symmetric multiprocessor data processing system according to claim 1, wherein said plurality of processing units are identical.

5. The symmetric multiprocessor data processing system according to claim 1, wherein at least one of said plurality of partial system memories does not contain any content of said system memory.

6. The symmetric multiprocessor data processing system according to claim 1, wherein contents within each of said plurality of partial system memories can be accessed by any of said plurality of processing units.

* * * * *